Feb. 12, 1952 — H. C. MEADOR — 2,585,667

VALVE ASSEMBLY

Filed Nov. 29, 1946

INVENTOR.
HORACE C. MEADOR

BY E. V. Hardway
ATTORNEY

Patented Feb. 12, 1952

2,585,667

UNITED STATES PATENT OFFICE 2,585,667

VALVE ASSEMBLY

Horace C. Meador, Houston, Tex., assignor to South Houston Machine Company, South Houston, Tex., a corporation of Texas Application November 29, 1946, Serial No. 712,798

4 Claims. (Cl. 251—77)

This invention relates to a valve assembly and has particular relation to means for adjusting the valve seal rings.

An object of the present invention is to provide a valve assembly having a cylindrical casing with a side port and an end port, said ports being in angular relation with a slidably mounted valve in the casing provided with spaced annular seals therearound said valve being movable to one position to open said ports and to another position to close the ports, said valve being so constructed that the annular seals may be adjusted to take up the wear to prevent leakage.

It is another object of the present invention to provide, in a valve assembly of the character described, a novel type of valve unit embodying a cylindrical valve body with spaced annular seals therearound and a spacer between said seals with a retainer sleeve having a threaded connection with the valve body and in abutting relation with the sealing unit whereby an endwise compressive force may be exerted against the seals to expand the same, as the seals wear, to prevent leakage.

With the above and other objects in view the invention has particular relation to certain novel features of construction, operation and arrangement of parts, an example of which is given in this specification and illustrated in the accompanying drawings, wherein.

Figures 1, 2:
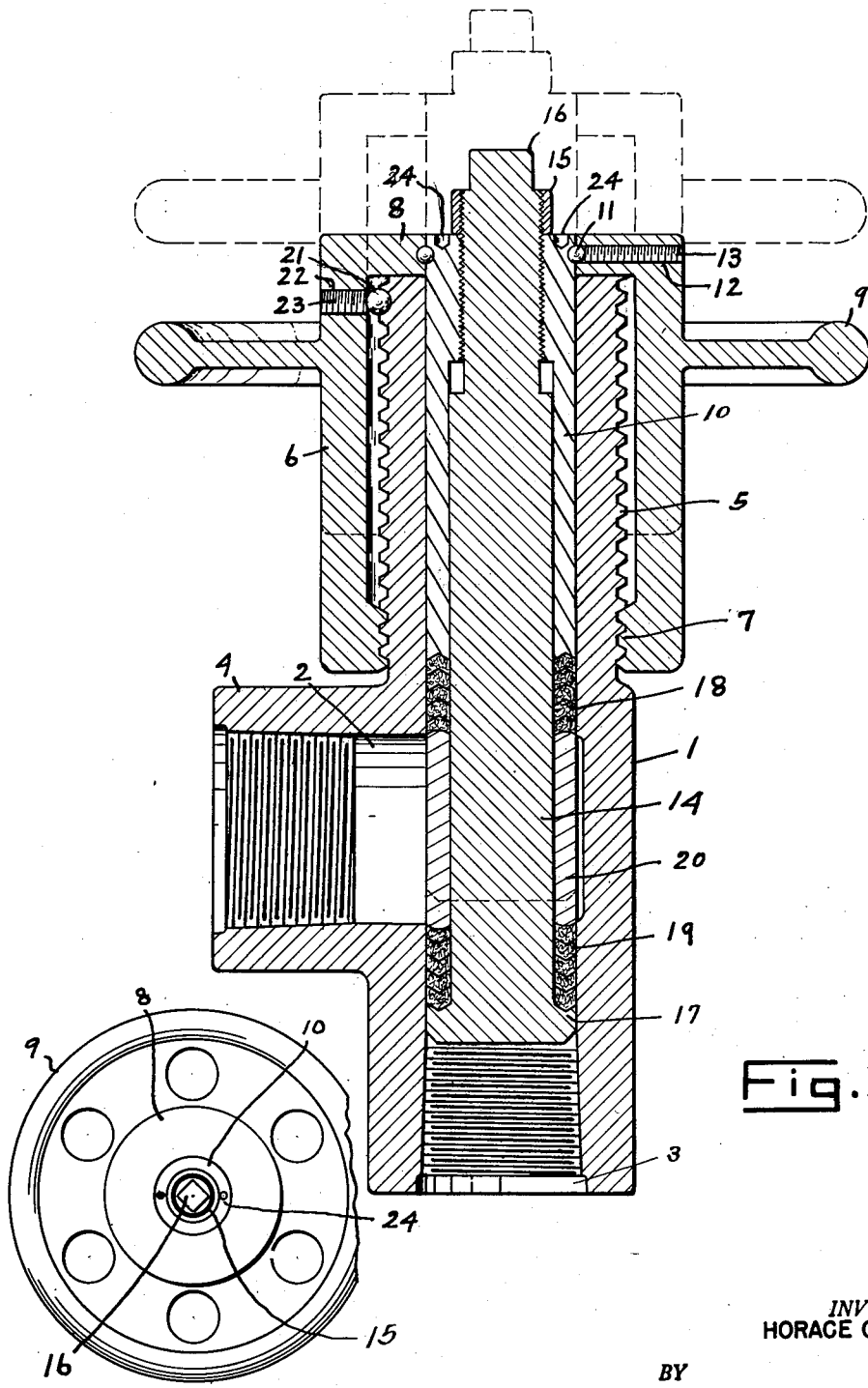
Figure 1 is an end view.
Figure 2 is an enlarged, longitudinal, sectional view of the assembly showing the valve partly open in dotted lines.

In the drawing the numeral 1 designates a tubular valve casing having a side inlet port 2 and an end inlet port 3.

The side inlet port is surrounded by a tubular nipple 4 formed integrally with the valve casing and internally threaded for the connection of a pipe thereto and the end inlet port is internally threaded for the connection of a pipe to the casing.

The end of the casing 1 opposite the inlet port 3 is provided with external coarse threads 5 and around said threaded end and spaced therefrom there is the valve actuating hood 6 whose inner end is inwardly thickened and provided with coarse internal threads 7 which mesh with the threads 5.

The outer end of the hood 6 is provided with an inwardly extended annular flange 8 which abuts the corresponding end of the valve casing 1 when the valve is closed. This hood, or cap, 6 has a hand grip 9 thereon by means of which it may be turned. There is a retainer sleeve 10 which is fitted within the valve casing and which is tubular in form. Its outer end is inwardly thickened and internally threaded. The sleeve 10 is rotatable relative to the casing 1 and relative to the hood, or cap, 6. It is maintained against endwise movement relative to said cap 6 by means of a series of anti-friction bearings 11 which are seated in registering grooves in the flange 8 and in the outer end of the sleeve 10, as shown. These bearings 11 may be inserted through a radial opening 12 in the cap 6 and which is thereafter closed by a threaded plug 13.

Within the retainer sleeve 10 there is a cylindrical valve body 14 whose outer end is reduced and threaded through the inwardly thickened portion of the retainer sleeve 10 and screwed onto the outer end of said valve body there is a retainer nut 15. The outer end of the valve body 14 is extended beyond the nut 15 forming the extension 16 for the reception of a wrench by means of which the valve body 14 may be turned relative to the retainer sleeve 10.

The inner end of the valve body 14 is formed with an external annular shoulder 17.

Around the valve body 14 there are the spaced seals 18 and 19 formed of suitable compressible sealing material and these seal rings are maintained spaced apart by the spacer 20 around the valve body. The seal 18 is between the inner end of the retainer sleeve and the opposing end of the spacer 20 and the seal 19 is between the shoulder 17 and the opposing end of the spacer 20.

These seals 18 and 19 are spaced a sufficient distance apart so that they will be on opposite sides of the port 2 when the valve is closed.

When it is desired to open the valve the cap 6 may be screwed outwardly until the valve clears the port 2 whereupon the inwardly thickened portion of the cap 6 will engage the ball 21 which is seated in a cavity in the outer end of the casing 1. This prevents the hood, or cap, 6 from becoming completely detached from the casing. The ball 21 may be introduced through an opening 22 in the cap 6 and retained in place by a screw plug 23 which is screwed into said opening 22.

When it is desired to close the valve the cap 6 may be screwed inwardly to move the valve into the position indicated in the figure.

The seals 18 and 19 will gradually wear and in case a leak develops the retainer sleeve 10 may be held stationary and a wrench applied to the extension 16 so as to screw the valve body longitudinally relative to the packing assembly to apply a compressive force to the seal rings and cause an expansion thereof to take up the wear and stop the leak. The lock nut 15 may then be screwed tightly against the outer end of the retainer sleeve 10 to maintain the parts against movement.

While turning the valve body 14 it is necessary that the retainer sleeve 10 be maintained stationary and for that purpose the outer end of the retainer sleeve is provided with the sockets 24, 24 to receive a spanner wrench whereby the retainer sleeve may be maintained against rotation.

The drawings and description are illustrative merely while the broad principle of the invention will be defined by the appended claims.

What I claim is:

1. A valve assembly comprising, a cylindrical valve casing having an inlet port and an outlet port, a valve movable in the casing into one position to close said ports and into another position to open said ports, valve operating means for manually moving said valve into either of said positions said means including a hood threaded on the valve casing and having an inwardly thickened portion, and bearing means rotatably carried by the casing and rotatively engageable with the inside of said hood, said bearing means being engageable with said thickened portion to limit outward movement of the valve operating means, said valve including a valve body having a shoulder at one end, a sealing assembly around the body abutting said shoulder and including annular seals around the body and a spacer around the body between said seals and a retainer sleeve around and having a threaded connection with the valve body and abutting the sealing assembly and having a rotatable connection with said valve moving means.

2. A valve assembly comprising, a cylindrical valve casing having a side port and an end port, a valve in the casing which includes annular seal rings spaced apart and located on opposite sides of the side port when the valve is in closed position, said valve including means for applying an endwise compressive force to the seal rings to cause expansion of said rings, valve operating means including a cap having a threaded connection with the casing and a swivelling connection with the valve for moving the valve longitudinally in the casing to open or closed position a ball rotatably carried by the casing and rotatively engageable with the inside of the cap, and means on the cap engageable with said ball upon predetermined movement of said cap in a direction to open the valve to limit movement of the cap in said direction.

3. A valve assembly comprising, a cylindrical valve casing having a side port and an end port, a valve in the casing having a sealing assembly thereon including annular seals arranged to space the seals on opposite sides of the side port when the valve is closed therearound and a spacer between said seals, means for applying an endwise compressive force to said sealing assembly to expand the seals, valve operating means including a cap having a threaded connection with the valve casing and a swivelling connection with the valve whereby the valve may be moved to one position to open said ports and bearing means rotatably carried by the casing and rotatively engageable with the inside of said cap, said cap having an inwardly thickened portion engageable with said bearing means to limit opening movement of the operating means after the valve has reached said open position and to another position to close the ports.

4. A valve assembly comprising, a cylindrical casing having an end port and a side port, a valve in the casing which includes a valve body having an external abutment on the inner end thereof, a sealing assembly around the body having annular seals and a spacer between the seals, a retainer sleeve around said body and having a threaded connection therewith and clamping the sealing assembly between it and said abutment, the outer end of said body being accessible for rotation relative to the retainer sleeve whereby an endwise compressive force may be applied to the sealing assembly, a cap threaded on the valve casing and having a swivelling connection with the retainer sleeve whereby the valve may be moved longitudinally in the casing to open or closed position by the rotation of said cap said casing having an external recess positioned within said cap, bearing means in said recess in rotative engagement with the inside of said cap, and said cap having an inwardly thickened portion forming a shoulder engageable with said bearing means upon movement of said cap in a direction to open the valve to limit movement of said cap in said direction.

HORACE C. MEADOR.

REFERENCES CITED

The following references are of record in the file of this patent:

UNITED STATES PATENTS

| Number | Name | Date |
|---|---|---|
| 923,413 | Davis | June 1, 1909 |
| 1,185,684 | Kraft | June 6, 1916 |
| 1,630,133 | Murphy | May 24, 1927 |
| 1,633,061 | Baumgartner | June 21, 1927 |
| 1,859,834 | May | May 24, 1932 |
| 2,023,560 | Wayer | Dec. 10, 1935 |
| 2,204,856 | Hinrichs | June 18, 1940 |
| 2,293,270 | Russell | Aug. 18, 1942 |

FOREIGN PATENTS

| Number | Country | Date |
|---|---|---|
| 411,262 | France | of 1910 |